Patented Feb. 5, 1952

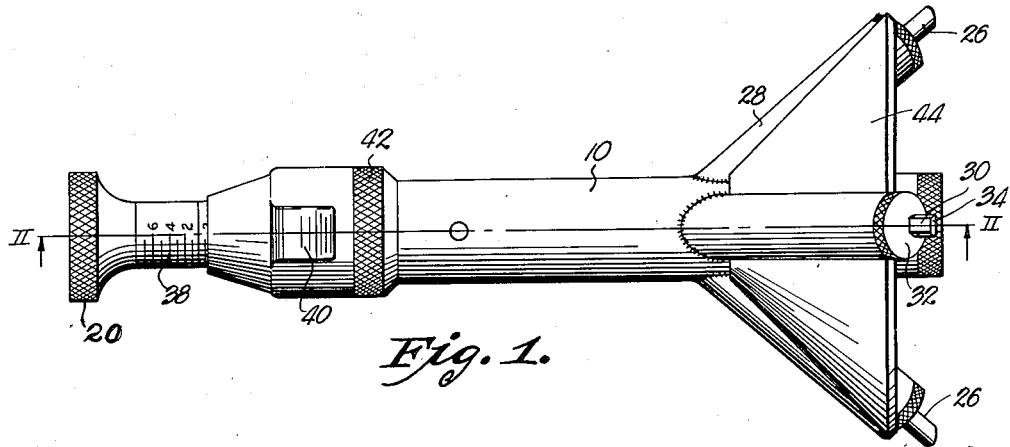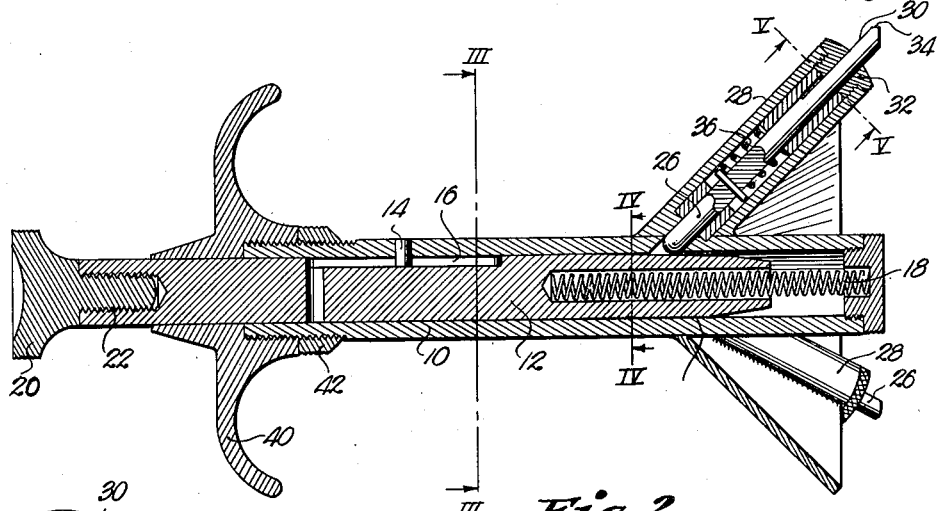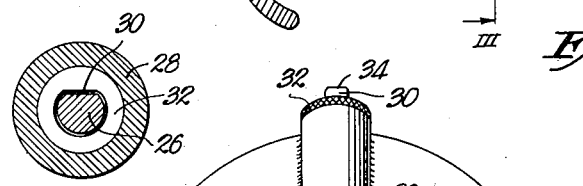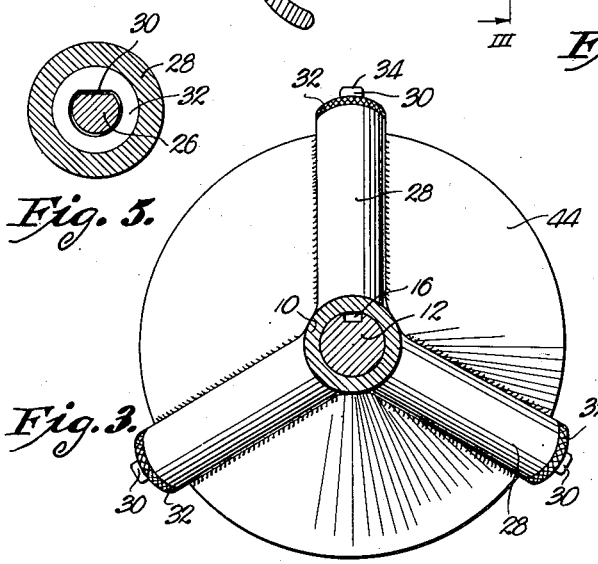

2,584,602

UNITED STATES PATENT OFFICE 2,584,602

INSIDE GAUGE

Percil C. McKee, Downers Grove, Ill.

Application October 22, 1945, Serial No. 623,623

3 Claims. (Cl. 33—178)

This invention relates to gauges of the character usable for making inside measurements, and is in the nature of a micrometer having a plurality of simultaneously shiftable feelers and means for indicating the dimension of the opening measured.

One of the primary aims of this invention is to provide an inside gauge that is accurate, easy to operate, capable of manipulation with assurance that the indicated dimension is true, and provided with positively acting elements for maintaining the component, shiftable parts in a normal condition.

A further aim of this invention is to provide an inside micrometer or gauge having a number of substantially radially disposed, shiftable feelers, all of which cooperate to indicate a reading on the scale designed for the purpose.

Other aims of the invention will appear during the course of the following specification, referring to the selected embodiment of the gauge which has been chosen for illustration. In the drawing:

Fig. 1 is a side elevational view of the inside gauge made in accordance with the present invention.

Fig. 2 is a longitudinal central sectional view taken on line II—II of Fig. 1.

Fig. 3 is a cross sectional view taken on line III—III of Fig. 2 and looking in the direction of the arrows.

Fig. 4 is a cross sectional view taken on line IV—IV of Fig. 2; and

Fig. 5 is a fragmentary detailed cross sectional view on an enlarged scale taken on line V—V of Fig. 2, and looking in the direction of the arrows.

The instrument is preferably constructed of metal and may be made any size, to present a tubular body 10 within which plunger 12 is reciprocably mounted for longitudinal movement, limited by pin 14.

This pin 14 rides in a slot 16 milled or otherwise formed in plunger 12, and a spring 18 yieldably maintains plunger 12 at one end of its path of travel with pin 14 against the end of slot 16 when no pressure is exerted by the manipulator upon head 20 secured as at 22 to one end of plunger 12.

The opposite end of plunger 12 has three inclined faces 24. These faces are created by tapering plunger 12 along a portion of its length for the purpose of motivating a number of feelers 26, each of which has its inner end frictionally engaged by one of the tapered faces 24.

Feelers 26 are reciprocably housed in tubular branches 28 extending at an angle from body 10. Each feeler 26 has a flattened length 30 cooperating with plug 32 to hold the feeler at a place where contacting face 34 will lie in substantial parallelism with the longitudinal axis of plunger 12.

A spring 36 yieldably maintains the feeler 26 against its associated face 24 and as plunger 12 is manually motivated, feelers 26 will move in and out to project and withdraw surfaces 34 toward or from the material being measured.

In measuring a round opening in a casting, for example, all feelers 26 move out and in at the same rate of speed and to the same degree. Their position is determined by reading scale 38, etched or otherwise marked on the surface of plunger 12 adjacent to head 20.

Finger grips 40 secured to an externally threaded portion of body 10 are held against rotation by a locking ring 42 and a three finger support is thereby provided which permits the operator to hold the entire gauge in a stabilized position while plunger 12 is moved in against the action of spring 18 to project feelers 26.

This type of measuring instrument is particularly advantageous because all feelers 26 are "live." Longer or shorter feelers 26 may be quickly positioned where openings of different diameters are encountered.

As a matter of good construction, branches 28 are rigidly secured in place by a substantially conical fin 44 welded or otherwise secured to the branches and to the outer surface of plunger 10.

It is conceivable that inside gauges having physical characteristics different from those shown in the drawing might be made without departing from the spirit of the invention or scope of the appended claims.

Having thus described the invention, what is claimed as new and desired to be secured by Letters Patent is:

1. An inside gauge comprising an elongated, tubular body having a plurality of tubular branches near one end thereof and in register therewith, said branches extending outwardly from the body at an acute angle relative to the longitudinal axis of the body and toward said one end of the latter; an elongated, calibrated plunger mounted in the body for reciprocatory movement on said axis of the body and having a tapered end in the body provided with a flat face corresponding to each branch respectively; an elongated feeler reciprocably mounted in each branch respectively and having means for yieldably holding the same biased against the respective flat face of the plunger; means in the body interposed between said one end thereof and the plunger for yieldably holding the latter biased toward the opposite end of the body; a member circumscribing said opposite end of the body in screw-threaded engagement therewith and surrounding the plunger for cooperation with the latter in reading the calibrations thereon; and a locking ring circumscribing the body at said opposite end thereof and in screw-threaded engagement therewith, said locking ring bearing against said member for holding the latter in an adjusted position relative to the plunger.

2. An inside gauge as set forth in claim 1 wherein the plunger is provided with an elongated, longitudinally extending slot and said tubular body is provided with a pin extending in the slot for holding the plunger against rotation relative to the body.

3. An inside gauge as set forth in claim 1 wherein each branch is provided with a plug for slidably receiving the corresponding feeler, there being interengaging flat surfaces on each feeler and its plug respectively for holding the feelers against rotation relative to the branches.

PERCIL C. McKEE.

REFERENCES CITED

The following references are of record in the file of this patent:

UNITED STATES PATENTS

| Number | Name | Date |
|---|---|---|
| 1,161,765 | Dunbar | Nov. 23, 1915 |
| 1,329,456 | Carpenter | Feb. 3, 1920 |
| 1,408,808 | Keopple | Mar. 7, 1922 |
| 1,416,694 | Leeuw | May 23, 1922 |
| 1,451,736 | Lauer | Apr. 17, 1923 |
| 1,465,295 | Bartholdy | Aug. 21, 1923 |
| 1,507,272 | Buckingham | Sept. 2, 1924 |
| 1,547,668 | Poltin | July 28, 1925 |
| 2,152,880 | Dowdy et al. | Apr. 4, 1939 |
| 2,400,440 | Rudolph | May 14, 1946 |
| 2,478,427 | Schmid | Apr. 9, 1949 |

FOREIGN PATENTS

| Number | Country | Date |
|---|---|---|
| 85,267 | Sweden | Nov. 14, 1935 |
| 233,596 | Switzerland | Nov. 1, 1944 |
| 245,407 | Switzerland | July 1, 1947 |
| 299,951 | Germany | Aug. 9, 1917 |